Apr. 17, 1923.
O. O. HOBSON
RESILIENT WHEEL
Filed Dec. 8, 1921
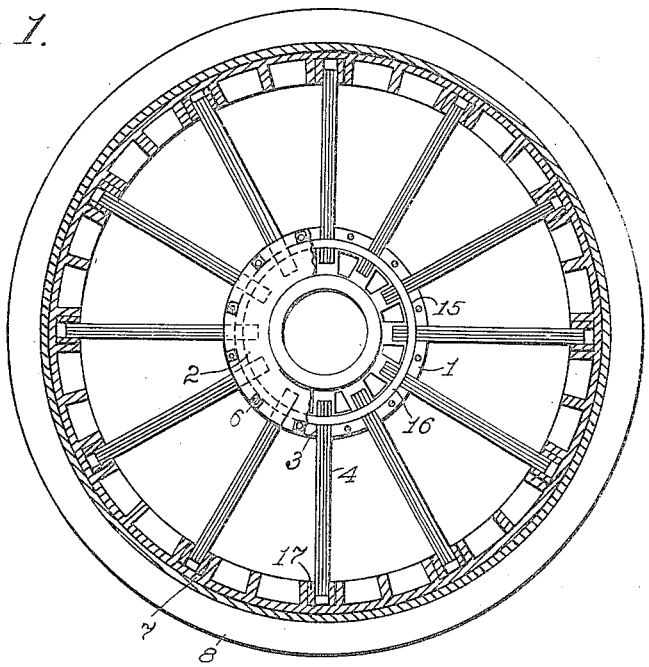
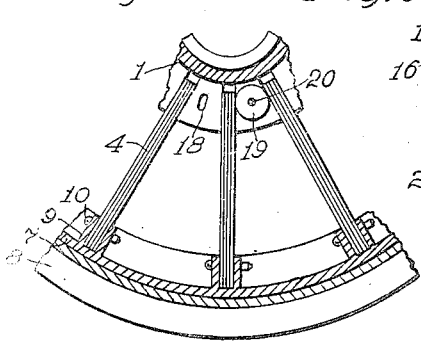
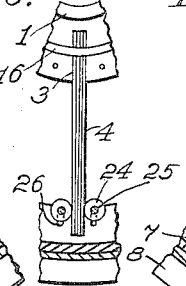
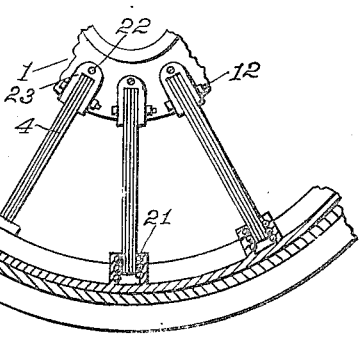
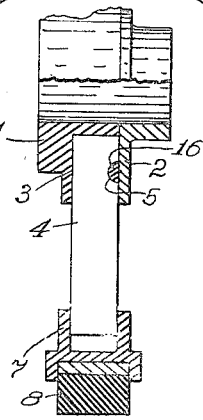
Inventor.
Ota O. Hobson, by
G. C. Kennedy
Attorney.

Patented Apr. 17, 1923.

1,451,827

UNITED STATES PATENT OFFICE.

OTA O. HOBSON, OF VINTON, IOWA.

RESILIENT WHEEL.

Application filed December 8, 1921. Serial No. 520,907.

*To all whom it may concern:*

Be it known that I, OTA O. HOBSON, a citizen of the United States of America, and a resident of Vinton, Benton County, Iowa, have invented certain new and useful Improvements in Resilient Wheels, of which the following is a specification.

My invention relates to improvements in resilient connections between spaced elements, and particularly to resilient carrying-wheels of vehicles and resilient spokes thereof, and the object of my improvement is to employ in any such structures connections or spokes as the case may be, made up of elastic laminæ, the laminæ of each connection or spoke being of equal length thus giving maximum strength for side thrust, and the ends of all laminæ of each connection or spoke being mounted within one of said elements in a slidable way and thus allowing for limited relative movements upon each other, and thereby giving the structure the maximum resiliency for sustaining loads or stresses of any kind.

This object I have accomplished by the means which are hereinafter described and claimed, and which are illustrated in the accompanying drawings, in which Fig. 1 is a side elevation with parts sectioned or broken away, of a wheel provided with resilient laminated spokes according to my invention, and Fig. 2 is a fragmental section on a slightly larger scale, Figs. 3, 4 and 5 are fragmental side elevations of resilient wheels of this type showing different modifications in the mountings of the spoke ends.

Similar numerals of reference denote corresponding parts throughout the several views.

While my invention in principle, may be used in any desired construction where it may be applicable, I have illustrated it as used in a resilient carrying-wheel of a vehicle such as that of a motor car.

Fig. 1 shows such a wheel having a channeled felly 7 onto which may be bolted or pressed a rim carrying a solid rubber tire 8. The wheel has the hollow hub 1 which is positioned concentrically within said felly when not flexed, and this hub has a plurality of radial recesses 3 on one face, the recesses opening at their outer ends and also opening outwardly laterally to seat the inwardly directed extremities of spokes 4. The spoke ends may be rigidly secured within said recesses by any desired means. As shown, an annular face-plate 2 is mounted upon the recessed face of said hub concentrically to cover said spoke ends in contact therewith and with the adjacent face of the hub, and is secured to the hub by means of bolts 6. In order to interlock the spoke ends with the hub, the outer edges of the spokes 4 have cross notches 5 to aline with a concentric annular groove 15 in the hub face, said groove and notches seating a locking-ring 16 which may be of a cross-sectional shape suitable for the purpose. It will be seen that the plate 2 compressingly interlocks the ring 16 to said spokes and hub rigidly, but that by simply removing the plate 2, any or all of said spokes may be removed as for renewal or repair.

The felly 7 may be constructed channel shape with bridges connecting side walls to strengthen same and also to contain boxings having bushings 17, and the outer ends of the spokes 4 may be extended thereinto part way for a free sliding fit. Each spoke 4 is composed of a number of contacting equal length relatively movable bars or laminæ for a purpose to be described.

In the modification illustrated in Fig. 3, the outer ends of the laminated spokes 4 are bolted at 10 between bridges 9 connecting side walls of channel felly while their inner ends are sliding between two rollers 19 on radially adjustable pintles 20 set in slots 18 mounted within the hub 1.

In the modification shown in Fig. 4, the inner end of each laminated spoke is secured by means of the bolt 12 in a U-shape shackle 23 which has a pivot bolt connection 22 with the hub 1, while their outer ends are sliding between ball-bearings 21 mounted within the felly 7.

In the modification shown in Fig. 5, the inner ends are locked in the hub 1 as shown in Fig. 1, while their outer ends are sliding between two rollers 24 adjustably, on pintles 25 seated in radial slots 26 within the felly 7.

Either of the constructions illustrated supplies a load bearing wheel of considerable resiliency, as the laminated spokes 4 have maximum elasticity relative to their cross sectional areas. This increased resiliency is due to the fact that each spoke has one end slidably mounted with the laminæ free to move upon each other longitudinally to a limited extent when the spoke as a whole is bent under a load or strain.

The pivotal connection of each spoke to the hub as shown in Fig. 4, or spoke sliding between adjustable rollers as shown in Figs. 3 and 5, allow somewhat freer movement to the spokes in the plane of the wheel.

Details of the hub and felly connections to the spokes may be varied otherwise than as shown.

As the laminæ of each spoke are of equal or approximately equal lengths, the spoke is of the same cross sectional strength throughout, and its extremities are fully and securely mounted and held. In case of the breakage or wearing out of a spoke or any of its laminæ, it may be quickly and separately demounted without removing others.

Having described my invention, what I claim as new and desire to secure by Letters Patent, is:

A resilient wheel, comprising a hub element, a felly element, a plurality of spokes therebetween, each spoke consisting of juxtaposed relatively lengthwise slidable laminæ connected rigidly at one end to one of said elements and connected loosely at the other end to the other of said elements, and an anti-fricton roller mounted rotatably and between each pair of adjacent spokes at their loose ends and contacting with both of them.

Signed at Waterloo, Iowa, this 25th day of Nov., 1921.

OTA O. HOBSON.